(12) United States Patent
Yang (10) Patent No.: US 9,755,228 B2
(45) Date of Patent: Sep. 5, 2017

(54) LITHIUM METAL ELECTRODE

(71) Applicant: Prologium Holding Inc., Grand Cayman (KY)

(72) Inventor: Szu-Nan Yang, New Taipei (TW)

(73) Assignee: PROLOGIUM HOLDING INC., Grand Cayman (KY)

(*) Notice: Subject to any disclaimer, the term of this patent is extended or adjusted under 35 U.S.C. 154(b) by 175 days.

(21) Appl. No.: 14/797,747

(22) Filed: Jul. 13, 2015

(65) Prior Publication Data

US 2016/0020461 A1 Jan. 21, 2016

(30) Foreign Application Priority Data

Jul. 16, 2014 (TW) ............... 103124343 A
Jun. 5, 2015 (TW) ............... 104118226 A (51) Int. Cl.
*H01M 4/36* (2006.01)
*H01M 4/04* (2006.01)
(Continued)

(52) U.S. Cl.
CPC ......... *H01M 4/366* (2013.01); *H01M 4/0461* (2013.01); *H01M 4/134* (2013.01); *H01M 4/1395* (2013.01); *H01M 4/382* (2013.01); *H01M 4/661* (2013.01); *H01M 4/667* (2013.01); *H01M 4/80* (2013.01); *H01M 10/049* (2013.01);
(Continued)

(58) Field of Classification Search
CPC .... H01M 4/366; H01M 4/134; H01M 4/1395; H01M 4/382; H01M 4/0461; H01M 4/667; H01M 4/80; H01M 4/463; H01M 4/386; H01M 4/387; H01M 10/049; H01M 10/052; H01M 4/661
See application file for complete search history.

(56) References Cited

U.S. PATENT DOCUMENTS 6,265,099 B1 7/2001 Gauthier et al.
8,785,046 B2 7/2014 Howard et al.
(Continued)

FOREIGN PATENT DOCUMENTS

CN 1489229 A 4/2004
CN 101048898 B 10/2007
(Continued)

*Primary Examiner* — Patrick Ryan
*Assistant Examiner* — Aaron Greso
(74) *Attorney, Agent, or Firm* — McClure, Qualey & Rodack, LLP (57) ABSTRACT

A lithium metal electrode is disclosed in this invention. The lithium metal electrode includes a lithium metal layer, a plurality of gate layers and a current collector layer having a plurality of holes. The gate layers are disposed corresponding to the holes. The lithium metal layer and the gate layers are disposed correspondingly. The lithium metal layer is insulated via the gate layers and/or the current collector layer before formation. While the gate layers are alloyed with the lithium ions from the media such as the electrolyte, the alloyed gate layers may provide the ionic access for the lithium metal layer so that the lithium metal layer may feedback the lithium ions back to the chemical system of the electricity supply system. Also, at the same time, the potentials of all the gate layers may be kept equally to the potential of the lithium metal layer.

21 Claims, 9 Drawing Sheets

(51) Int. Cl.

| | | |
|---|---|---|
| *H01M 4/134* | (2010.01) | |
| *H01M 4/1395* | (2010.01) | |
| *H01M 4/38* | (2006.01) | |
| *H01M 4/66* | (2006.01) | |
| *H01M 4/80* | (2006.01) | |
| *H01M 10/04* | (2006.01) | |
| *H01M 10/052* | (2010.01) | |
| *H01M 4/46* | (2006.01) | |

(52) U.S. Cl.
CPC .......... *H01M 10/052* (2013.01); *H01M 4/386* (2013.01); *H01M 4/387* (2013.01); *H01M 4/463* (2013.01)

(56) References Cited

U.S. PATENT DOCUMENTS

| | | |
|---|---|---|
| 2004/0072066 A1 | 4/2004 | Cho et al. |
| 2008/0153000 A1 | 6/2008 | Salot et al. |
| 2010/0216027 A1 | 8/2010 | Fujii |
| 2012/0251891 A1 | 10/2012 | Li et al. |
| 2012/0276421 A1 | 11/2012 | Aihara et al. |

FOREIGN PATENT DOCUMENTS

| | | | | |
|---|---|---|---|---|
| CN | 101814372 A | | 8/2010 | |
| CN | 102097647 A | | 6/2011 | |
| CN | 102683639 | * | 9/2012 | ........ H01M 10/0525 |
| CN | 202905890 U | | 4/2013 | |
| JP | 1986-151975 A | | 7/1986 | |
| JP | 1988-013264 A | | 1/1988 | |
| JP | H11-283676 | * | 10/1999 | ............ H01M 10/40 |
| JP | 2010-182448 A | | 8/2010 | |
| KR | 10-0582558 B | | 5/2006 | |
| KR | 10-2011-0019101 A | | 2/2011 | |
| KR | 10-2013-0067920 A | | 6/2013 | |
| KR | 20140048910 A | | 4/2014 | |
| TW | 201327989 A1 | | 7/2013 | |
| WO | 2013/003846 A2 | | 1/2013 | |
| WO | 2013/140940 A1 | | 9/2013 | |

* cited by examiner

LITHIUM METAL ELECTRODE

This application claims the benefit of priority based on Taiwan Patent Applications No. 103124343, filed on Jul. 16, 2014 and No. 104118226, filed on Jun. 5, 2015, the contents of which are incorporated herein by reference in their entirety.

BACKGROUND

1. Technical Field

The present invention is related to an electrode, in particular to an electrode having gate layers.

2. Description of Related Art

Comparing to the current non-lithium battery system, the lithium battery system has advantages of high operation voltage (up to 3.6V), high energy density (up to 120 Wh/kg), light weight, longer cycle life, friendly to the environment and so on. According to the researching history of the lithium battery system, the earliest lithium battery developed is the rechargeable lithium metal battery which has pretty high energy density but meanwhile has serious issues of stability and safety because of the high chemical reacting ability to the electrolyte. Considering the safety issue of the lithium metal battery system, the developments of the rechargeable lithium battery gradually focus on the rechargeable lithium-alloy battery system and the rechargeable lithium-ion battery system. However, the electrolyte of the lithium-ion battery system is the liquid comprising organic solvents so that the evaporation, ignition problems occur inevitably. Besides, the electrolyte leaks due to the poor sealing of the battery and this causes the safety issue. Recently, in order to ensure the safety, the rechargeable lithium polymer battery system is developed. The original organic solvents are replaced by the polymer electrolyte to improve the safety of the lithium battery system.

Yet, the newest portable smart electrical devices are on the market continuously. The performances of the devices are improved for every generation. As for the performances of the battery system, except for the safety requirement, it is crucial to ensure that the capacity of the battery system is enough for supporting the operation duration of the device. Consequently, the capacity of the battery system becomes the important developing issue again. In the past, the development of the lithium metal battery system was suspended due to its safety issue. Comparing to the lithium-ion and the lithium polymer systems, the energy density of the lithium metal system is much higher than other systems. However, because the lithium metal has high chemical activity, an extreme oxidation-reduction reaction occurs if the lithium metal is not stored or operated under the proper condition. Practically, the lithium metal battery system is quite suitable for the current smart electrical device only if the issues of safety, processing and storage of the lithium metal can be conquered.

Accordingly, a lithium metal electrode is provided to overcome the above problems.

SUMMARY OF THE INVENTION

It is an objective of this invention to provide a lithium metal electrode. The lithium metal layer is completely covered via the current collector layer and/or the gate layer so that the lithium metal can be processed to form as the conventional lithium-based electrode structure. Comparing to the conventional lithium-based battery system, the same procedures can be exerted for the lithium metal electrode to produce a battery system having higher energy density.

It is an objective of this invention to provide a lithium metal electrode. The gate layer can alloy with the lithium ions and/or the lithium metal layer under the condition of medium. The structure of the gate layer is gradually transferred from the original state into the particulate alloy-mud state so that the volume of the gate layer swells due to lots of pores formed via the loosen-packed lattice. An electrical-chemical reaction path can be provided via the alloyed gate layer for the lithium ions and the lithium metal layer.

It is an objective of this invention to provide a lithium metal electrode, which can be assembled to the conventional cathode electrode to form a lithium-based battery.

The present invention discloses a lithium metal electrode which comprises a lithium metal layer, several gate layers and a current collector layer. The current collector layer has a plurality of holes where the gate layers are disposed correspondingly. The lithium metal layer and the gate layers are disposed correspondingly. The gate layers of the lithium metal electrode of the present invention can alloy with the lithium ions and/or the lithium metal layer under the condition of medium. The structure of the gate layers are gradually transferred from the original state into the particulate alloy-mud state so that the volume of the gate layer swells due to lots of pores formed via the loosen-packed lattice. An electrical-chemical reaction path can be provided via the alloyed gate layer for the lithium ions and the lithium metal layer. Besides, the lithium metal electrode can be assembled to the conventional cathode electrode to form a lithium-based battery having high energy density.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION

The present invention is to provide a lithium metal electrode which comprises the pure lithium metal but is still able to store and to be operated under normal condition instead of in the extremely controlled environment. A battery system having high energy density and high safety can be formed via assembling the lithium metal electrode to the conventional cathode electrode. The lithium metal electrode of the present invention comprises a lithium metal layer, a plurality of gate layers and a current collector layer. The current collector layer has a plurality of holes. The gate layers are disposed corresponding to the holes. The lithium metal layer and the gate layers are correspondingly. The lithium metal layer can be disposed adjacent to the gate layers or can be disposed far away from the gate layers. As the lithium metal layer is disposed adjacent to the gate layers, the lithium metal layer further contacts with the gate layers or not. Through the addition of the medium, the gate layers are alloyed and the reaction paths are formed so that the lithium metal layer is able to proceed the oxidation-reduction reaction. Besides, the lithium metal electrode of the present invention can be easily assembled to the conventional cathode electrode to form a battery system having high energy density.

Figure 1A:
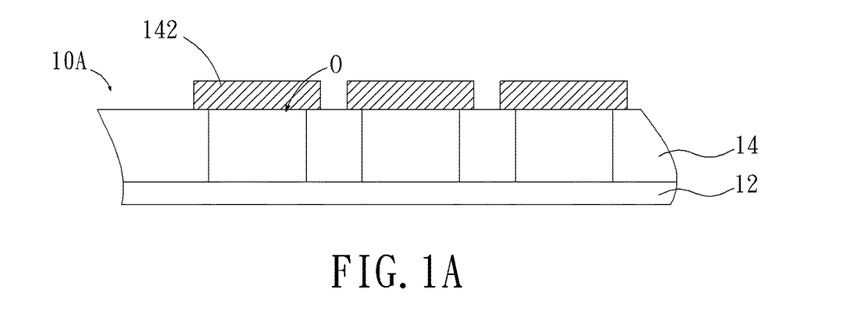
FIGS. 1A, 1B, 1C and 1D illustrate the lithium metal electrode of this present invention.
Figure 2A:
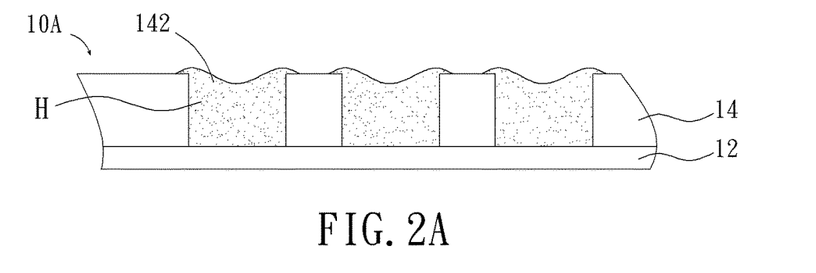
FIG. 2A illustrates the alloyed gate layer according to FIG. 1A.

Referring to FIGS. 1A and 2A. The FIG. 1A illustrates the lithium metal electrode of this present invention; the FIG. 2A illustrates the alloyed gate layer of the lithium metal electrode according to FIG. 1A.

From the partial cross-section view of the lithium metal electrode 10A, the lithium metal layer 12 is disposed in the bottom and the current collector layer 14 having a plurality of holes H is disposed adjacent to the lithium metal layer 12. Away from the lithium metal layer 12, the gate layers 142 are disposed on the openings O of the holes H without contacting with the lithium metal layer 12 and are partially covered the surface of the current collector layer 14.

Based on the structure of the lithium metal electrode 10A, as the lithium metal electrode 10A is applied to a battery system (not shown), the lithium metal electrode 10A can be the anode electrode which can be assembled to the cathode electrode. Before the electrical-chemical reactions of the battery system occur, the gate layers 142 do not react with the lithium ions and the lithium metal so that, at the moment, the structures of the gate layers 142 are stable and in good shape. Accordingly, the lithium metal layer 12 is under the protection of the current collector layer 14 and/or the gate layers 142 from the medium. Meanwhile, the lithium metal layer 12 can suffer higher temperature and higher pressure during processing. Once the electrical-chemical reactions of the battery system occur, that is, the voltage gradient exists between the cathode and anode electrodes, the lithium ions provided via the medium and the cathode electrode start to migrate from the cathode electrode to the lithium metal electrode 10A under the condition of charging. The lithium alloys are formed via the lithium ions and/or the lithium metal reacting with the gate layers 142 of the lithium metal electrode 10A. The crystal lattices of the gate layers 142 gradually break down as the alloying reaction proceeding and by the reaction duration increasing, the crystal lattices of the gate layers 142 are transformed into disorderly muddy alloyed materials. As the alloying reaction of the gate layers 142 and the lithium ions keeping proceeding, more and more muddy alloyed materials can be formed and the muddy alloyed materials fill into the holes H via the medium (such as the electrolyte). At last, plenty of electrical-chemical reaction paths are formed inside the holes H, via the tiny pores inside the muddy alloyed materials soaking the medium, so that the lithium metal layer 12 is immerged in the medium. Once the lithium metal layer 12 is immerged in the medium, the potentials of current collector layer 14 and the gate layers 142 of the lithium metal electrode 10A are close to the potential of the lithium metal layer 12, as illustrated in FIG. 2A. The medium mentioned above is made of a material selected from the group consisting of a liquid-phase electrolyte, a solid-phase electrolyte, a gel-type electrolyte, a liquid ion or a combination thereof.

More precisely, as no voltage gradient existing between the cathode and anode electrodes, there is no driving force for the chemical reactions inside the battery system, that is, the gate layers 142 do not react with the lithium-based medium. Once the battery system is under the condition of charging, taking the first-time charging as the example, that is, taking the formation as the example, the gate layers 142 only react with the lithium ions and/or the lithium metal to form the lithium alloy via the medium and has no reaction with the lithium metal layer 12 because no contact between the gate layers 142 and the lithium metal layer 12. In the beginning, the lithium alloys are formed in the interface of the gate layers 142 and the medium. By the reaction duration increasing, most of the gate layers 142 are reacted with the lithium ions and/or the lithium metal to from the lithium alloys, the crystal lattices of the gate layers 142 break down and the structure transforms into disorder alloy mud. The muddy lithium alloys fill into the holes H of the current collector layer 14 so that the medium can reach to the surface of the lithium metal layer 12 via the lithium alloys. Apparently, the ions and the electrons inside the battery system are not able to exchange unless a certain amount of the gate layers 142 breaking down to form the lithium alloys. On the other hand, after the formation or couple times of charging and discharging, the gate layers 142 breaking down due to the alloying reaction are no longer to isolate the lithium metal layer 12 from the medium. The medium is able to reach to the lithium metal layer 12 through soaked via the breaking gate layers 142 (i.e. lithium alloys) filling inside the holes H. The lithium metal layer 12 contacting with the medium starts to proceed the electrical-chemical reactions inside the battery system. Accordingly, the procedure of alloying is irreversible, that is, once the metal materials of the gate layers 142 break down to form the disorder alloyed materials, there is no way to reverse the reaction mentioned above. Hence, before the alloying reaction, the gate layers 142 can protect the lithium metal layer 12 from the contact with anything including the medium in the form of metal and/or metalloid. After the alloying reaction, the structures of the gate layers 142 break down and the lithium alloys are formed. Since then, the alloyed gate layers 142 take the place of the original gate layers 142.

One of the functions of the lithium metal layer 12 is to make the potentials of the gate layers 142 kept close to the potential of the lithium metal layer 12, that is, to make the potentials of the gate layers 142 are close to the relative 0 volt which is the potential of the formation of the lithium metal. Under this condition, the configurations of the lithium alloys formed via the lithium ions and the gate layers 142 can be much more delicate and uniform.

Figure 1B:
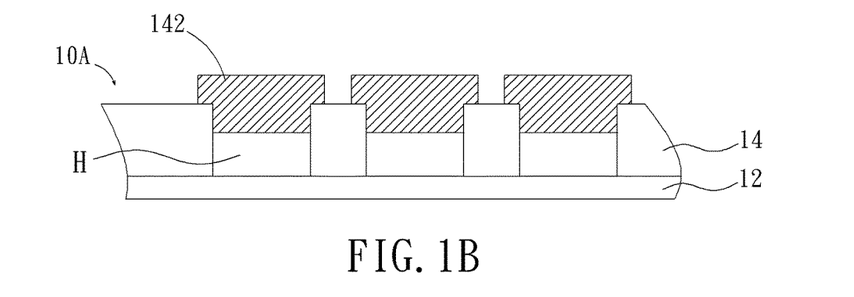
Figure 1C:
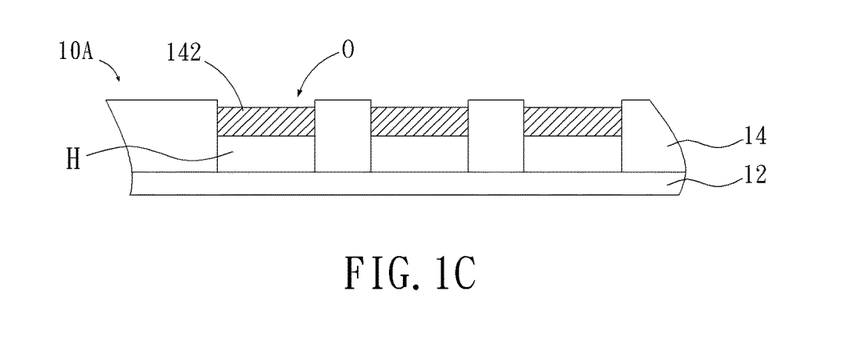
Figure 1D:
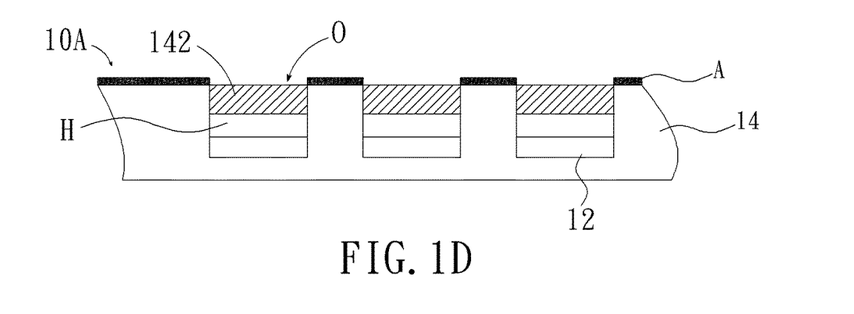
Figure 2B:
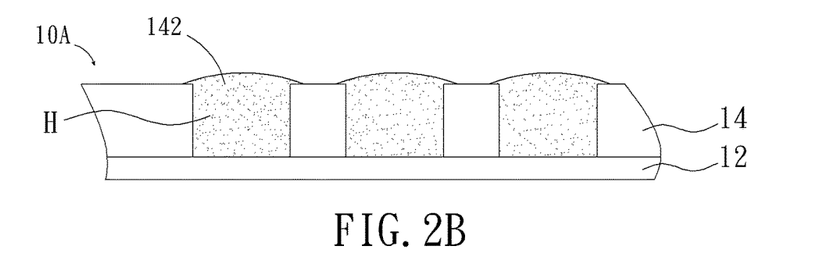
FIG. 2B illustrates the alloyed gate layer according to FIG. 1B.
Figure 2C:
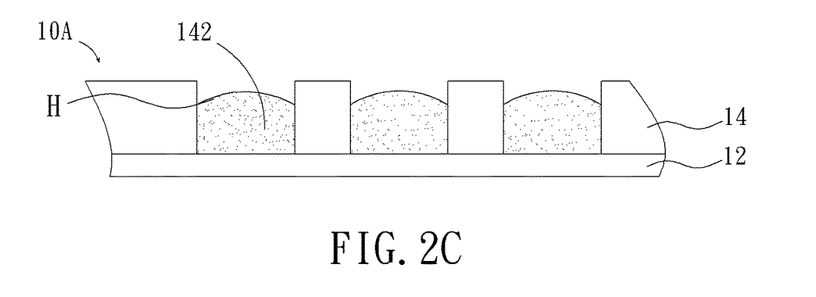
FIG. 2C illustrates the alloyed gate layer according to FIG. 1C.
Figure 2D:
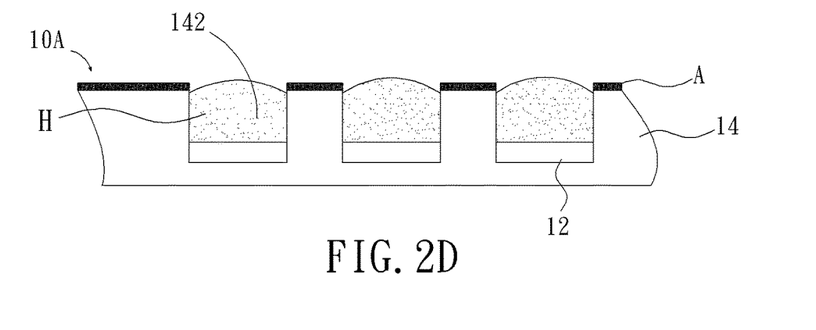
FIG. 2D illustrates the alloyed gate layer according to FIG. 1D.

Besides the embodiment of covering the openings O, the gate layers 142 can further fill into the holes H, as illustrated in FIG. 1B. The alloyed gate layers 142 are illustrated in FIG. 2B. Beside the embodiments mentioned above, the gate layers 142 can completely fill into the holes H, as illustrated in FIG. 1C. The alloyed gate layers 142 are illustrated in FIG. 2C. Although the gate layers 142 of these embodiments illustrate no any contact with the lithium metal layer 12, in fact, the gate layers 142 can contact with the lithium metal layer 12. In the previous embodiments, the holes H of the current collector 14 are illustrated as the through holes, however, the holes H can be the blind holes as illustrated in FIG. 1D. The alloyed gate layers 142 are illustrated in FIG. 2D. The lithium metal layer 12 can completely or partially covers one surface of the current collector layer 14. For instance, as the holes H are the through holes, corresponding to the gate layers 142, the lithium metal layer 12 can covers the openings O, covers the openings O and fills holes H or only fills holes H.

To avoid the lithium deposition on the outer surface of the current collector layer 14 before the lithium ions migrating into the current collector layer 14 as well as to avoid electroplating reaction occurring on the outer surface of the current collector layer 14 as over-charging or over-discharging, several isolation regions A are disposed on the outer surface, which is away from the lithium metal layer 12, of the current collector layer 14 to electrically isolate the current collector layer 14. The isolation regions A are electrically isolated. The isolation region A can be in the shape of layer structure and/or be a treated surface having the electrical isolating property.

The current collector layer 14 is made of a material selected from the group consisting of copper, nickel, iron, zinc, titanium, silver, gold and/or any lithium-unalloyable materials, that is, the materials those cannot alloy with the lithium ion and/or the lithium metal. The material of the gate layer 142 can be made of the metal material and/or the metalloid material, wherein at least one kind of material is able to alloy with the lithium ion and/or the lithium metal, that is, the gate layer 142 comprises at least one kind of lithium-alloyable material. Besides the lithium-alloyable material, the gate layer 142 further comprises at least one kind of material that cannot react with the lithium ion and/or the lithium metal. All the materials of the gate layer 142 can exist as the non-alloyed material or the alloyed material. For instance, the non-alloyed material can be formed via patterned deposition, sputtering and/or electroplating. The lithium-alloyable material of the gate layer 142 is made of aluminum, alloyed aluminum, tin, alloyed tin, silicon, alloyed silicon or any material which can alloy with the lithium. The content of the lithium-alloyable materials is not less than 0.1%; the rest ingredients of the gate layer 142 are the lithium-unalloyable materials those cannot alloy with the lithium ion and/or the lithium metal. The lithium-unalloyable materials are made of copper, nickel, iron, titanium, zinc, silver, gold and/or any lithium-unalloyable materials. For instance, the gate layers 142 is made of a dual-alloy such as Ni—Sn alloy, wherein the Sn can alloy with the lithium ion and/or the lithium metal, the Ni cannot alloy with the lithium ion and/or the lithium metal and the content of the Sn is not less than 0.1%.

According to FIGS. 1A to 1D and 2A to 2D, the lithium metal layer is disposed away from the gate layers. In the following drawings, FIGS. 3A to 3D, 4A to 4D, 5A to 5D and 6A to 6D, illustrate the embodiments that the lithium metal layer is disposed adjacent to the gate layers.

Figure 3A:
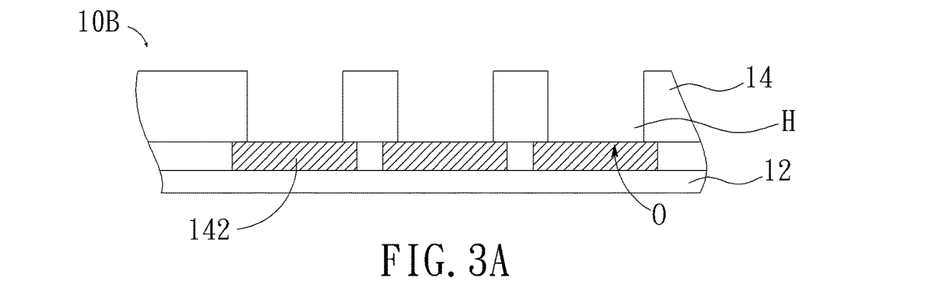
FIGS. 3A, 3B, 3C and 3D illustrate the lithium metal electrode further comprising an ionic conducting layer of this present invention.
Figure 3B:
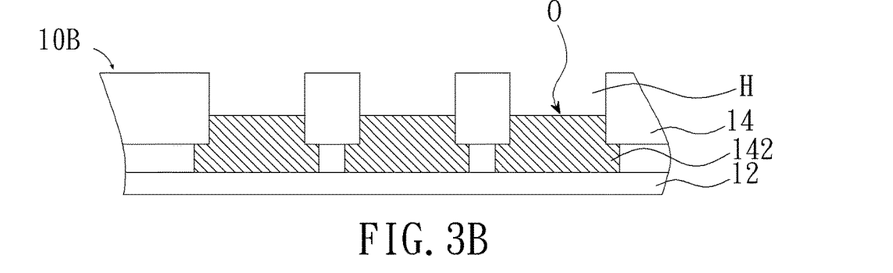
Figure 3C:
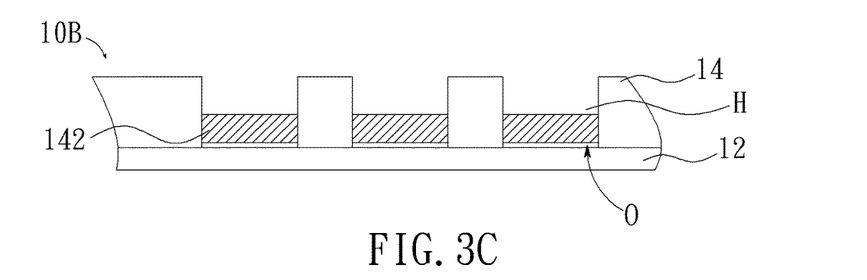
Figure 3D:
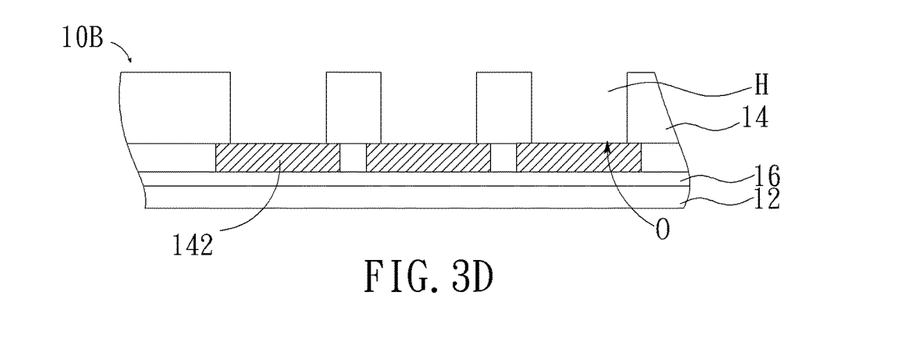
Figure 4A:
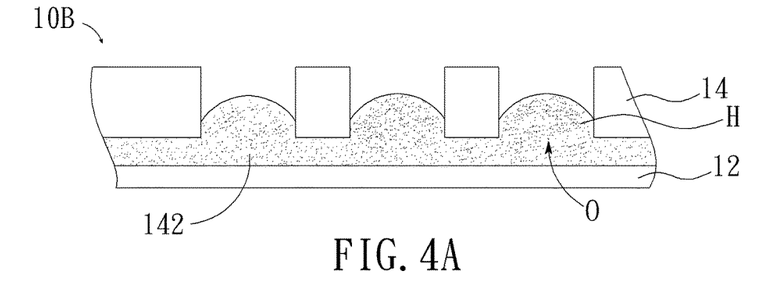
FIG. 4A illustrates the alloyed gate layer according to FIG. 3A.
Figure 4B:
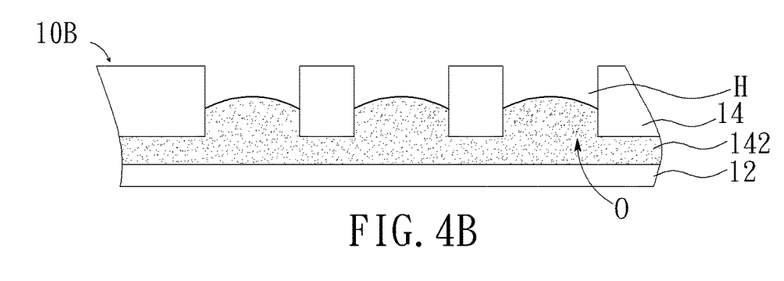
FIG. 4B illustrates the alloyed gate layer according to FIG. 3B.
Figure 4C:
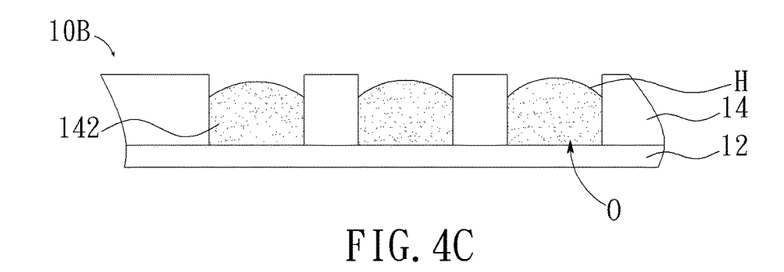
FIG. 4C illustrates the alloyed gate layer according to FIG. 3C.
Figure 4D:
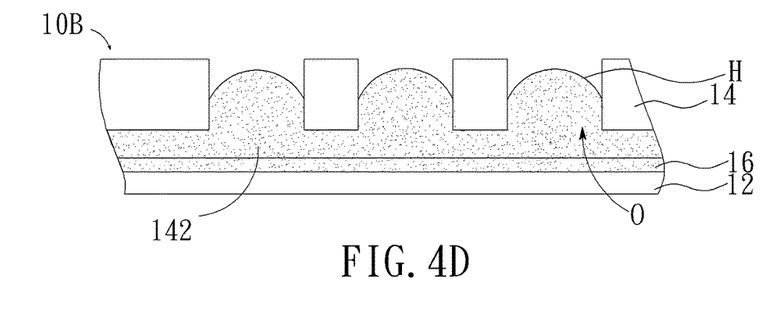
FIG. 4D illustrates the alloyed gate layer according to FIG. 3D.

Referring to the FIGS. 3A to 3D, the embodiments of the lithium metal layer disposed adjacent to the gate layers are illustrated. The lithium metal electrode 10B comprises a lithium metal layer 12, a plurality of gate layers 142 and a current collector layer 14. The current collector layer 14 has a plurality of holes H. As illustrated in FIG. 3A, the gate layers 142 covers the openings O of the holes H adjacent to the lithium metal layer 12. The FIG. 3B illustrates the gate layers 142 cover the openings O and further fill the holes H, wherein the openings O are adjacent to the lithium metal layer 12. In FIG. 3C, the gate layers 142, which are disposed adjacent to the lithium metal layer 12, fill the holes H without covering the openings O so that the gate layers 142 do not cover the surface of the current collector layer 14. The lithium metal layer 12, which is illustrated in FIGS. 3A to 3C, can partially or completely cover the surface of the current collector layer 14. The ionic conducting layer 16 can also be applied in the above embodiments and is illustrated in FIG. 3D. The FIGS. 4A to 4D are illustrated the alloyed gate layers 142 according to the FIGS. 3A to 3D, wherein the lithium metal layer 12, the current collector layer 14, the gate layers 142, the ionic conducting layer 16 and isolation region (not shown) have been disclosed as the mentioned above.

According to the various relative positions of the gate layers and the lithium metal layer versus the holes/openings of the current collector layer as well as the various relative positions of the lithium metal layer versus the gate layers, the embodiments shown in above drawings illustrate the various positions of the gate layers versus the holes/openings of the current collector layer as different relative positions of the lithium metal layer versus the gate layers. In the following drawings, FIGS. 5A to 5C, the embodiments, which show the various positions of the lithium metal layer versus the holes/openings of the current collector layer as the gate layers filled in the holes, are illustrated. Besides the example of the gate layers filled in the holes, these embodiments of the lithium metal layer can also apply to different implements of the gate layers, ionic conducting layer and isolation region.

Figure 5A:
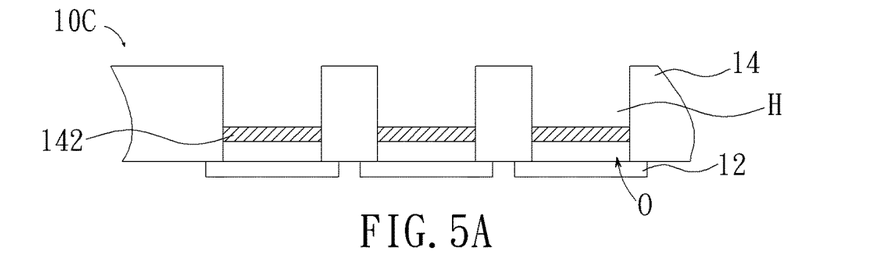
FIGS. 5A, 5B and 5C illustrate the lithium metal electrode of this present invention.
Figure 5B:
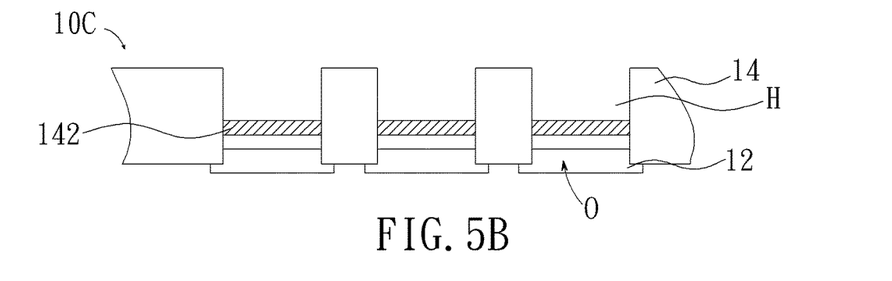
Figure 5C:
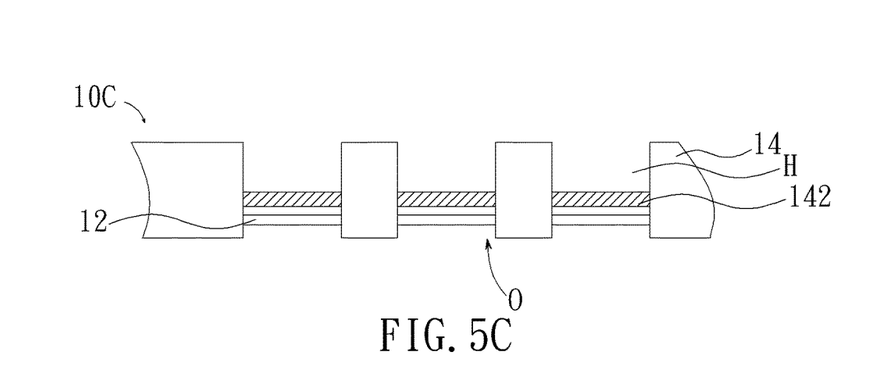
Figure 5D:
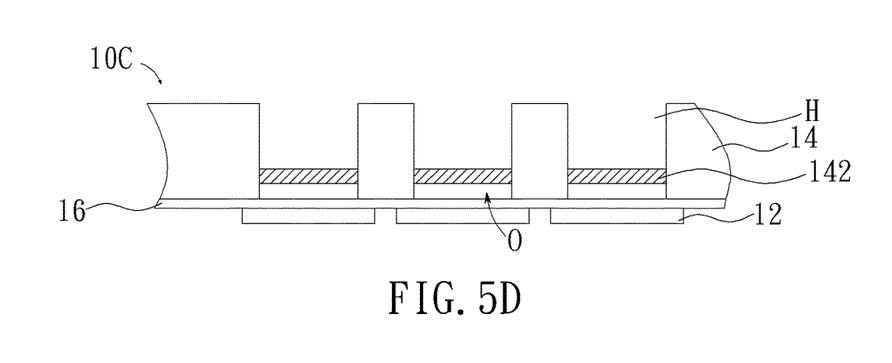
FIG. 5D illustrates the lithium metal electrode further comprising an ionic conducting layer of this present invention.
Figure 6A:
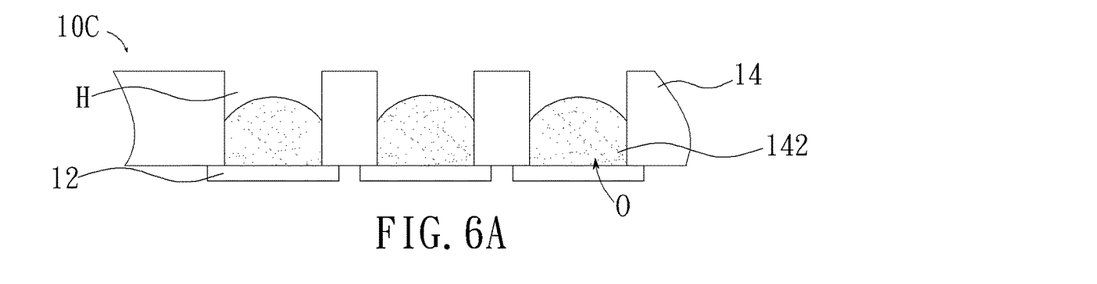
FIG. 6A illustrates the alloyed gate layer according to FIG. 5A.
Figure 6B:
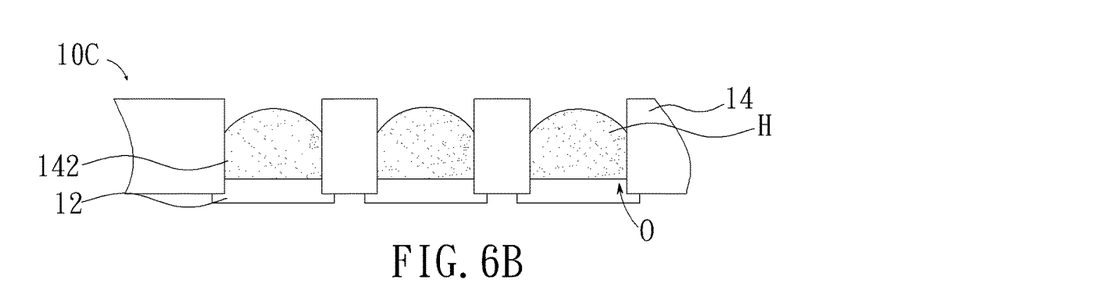
FIG. 6B illustrates the alloyed gate layer according to FIG. 5B.
Figure 6C:
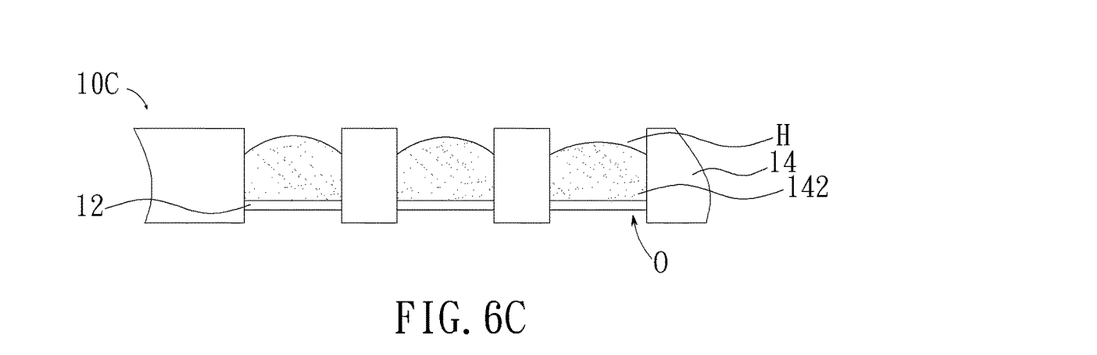
FIG. 6C illustrates the alloyed gate layer according to FIG. 5C.
Figure 6D:
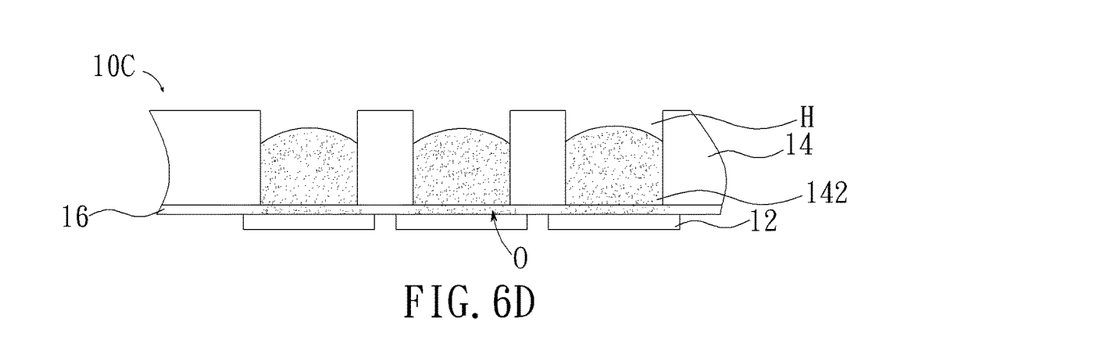
FIG. 6D illustrates the alloyed gate layer according to FIG. 5D.
Figure 7A:
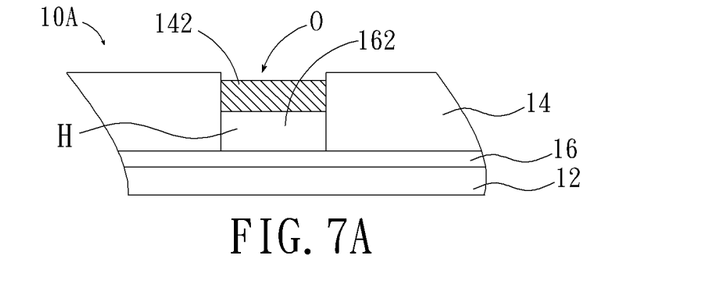
FIGS. 7A, 7B and 7C illustrate the lithium metal electrode of this present invention.
Figure 8A:
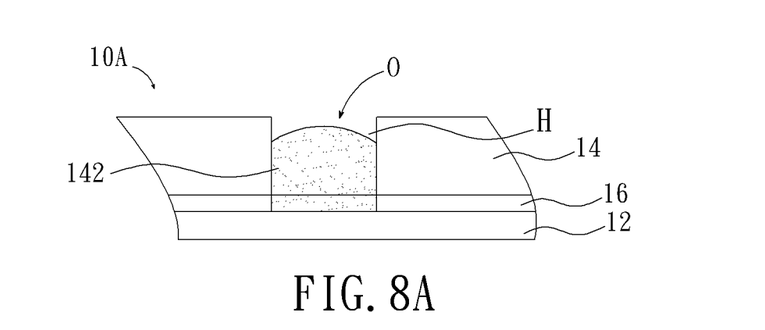
FIG. 8A illustrates the alloyed gate layer according to FIG. 7A.

In FIG. 5A, the lithium metal electrode 10C comprises a lithium metal layer 12, a plurality of gate layers 142 and a current collector 14. The current collector layer 14 has a plurality of holes H where the gate layers 142 are disposed. The lithium metal layer 12, which is adjacent to the gate layers 142, covers the openings O of the holes H. As illustrated in FIG. 5B, the lithium metal layer 12, which is adjacent to the gate layers 142 disposed inside the holes H, covers the openings O and further fills into the holes H. The lithium metal layer 12 fills into the holes H and is adjacent to the gate layers 142 inside the holes H. For these embodiments, the lithium metal layer has no contact with the gate layers; however, in the examples of those the lithium metal layer adjacent to the gate layers, the lithium metal layer may contact with the gate layers. In FIG. 5D, the lithium metal electrode 10C comprising an ionic conducting layer 16 is illustrated. According to the FIGS. 5A to 5D, the FIGS. 6A to 6D illustrate the alloyed gate layer of the lithium metal electrode. In the following, more details of the ionic conducting layer are disclosed. Referring to FIGS. 7A and 8A. The FIG. 7A illustrates the lithium metal electrode of this present invention; the FIG. 8A illustrates the alloyed gate layer of the lithium metal electrode according to FIG. 7A.

The lithium metal electrode 10A illustrated comprising a lithium metal layer 12, a current collector layer 14, several gate layers 142 and an ionic conducting layer 16. The ionic conducting layer 16 is disposed between the lithium metal layer 12 and the current collector layer 14 (including the gate layers 142). Practically, the ionic conducting layer 16 contacts with the lithium metal layer 12, the current collector layer 14 and the gate layers 142 or substantially contacts with the lithium metal layer 12 and the current collector layer 14. The ionic conducting layer 16 is in the shape of porous structure, grid structure, rod structure or a combination thereof. In FIG. 7A, the ionic conducting layer 16 contacts with the lithium metal layer 12 and the current collector layer 14. The structure of the lithium metal electrode 10A includes the lithium metal layer 12, the ionic conducting layer 16, the gate layers 142 disposed in the openings O and the current collector layer 14. The properties of the lithium metal layer 12, the current collector layer 14 and the gate layers 142 have been disclosed above. The properties of the ionic conducting layer 16 would be disclosed hereinafter First of all, because the ionic conducting layer 16 is disposed between the lithium metal layer 12, the current collector layer 14 and the gate layers 142, apparently, the main function of the ionic conducting layer 16 is to provide good ionic conductivity between the lithium metal layer 12, the current collector layer 14 and the gate layers 142. Meanwhile, the electrical conductivity of the ionic conducting layer 16 must be good enough in order to maintain or even to improve the electrical conductivity between the lithium metal layer 12, the current collector layer 14 and the gate layers 142. The ionic conductive ability of the ionic conducting layer 16 can be based on its material intrinsic property, based on the pores itself with the electrolyte material, such as a liquid-phase electrolyte, a solid-phase electrolyte, a gel-type electrolyte, a liquid ion, and/or based on the combination thereof. Comparing to the ionic conductive ability of the ionic conducting layer 16, the electrical conductive ability may not be carried out by the ionic conducting layer 16 itself. For instance, the electrical conductive ability can be carried out via the alloyed gate layers 142 served as the electrical conductive material. It is because that, after alloying reaction, the lattices of the gate layers 142 become loosen and the volume swells so that the gate layers 142 fill into the pores of the ionic conducting layer 16 to make the current collector layer 14 and the lithium metal layer 12 electrically connected. Besides, the ionic conducting layer 16 contacts with the lithium metal layer 12 so the ionic conducting layer 16 cannot alloy with the lithium metal layer 12 under any conditions. In FIG. 7A, a depletion layer 162 is disposed inside the opening O which has a gate layer 142 and an ionic conducting layer 16 in the two ends. The depletion layer 162 is an empty space before electrical-chemical reaction of the battery system occurs. Or the depletion layer 162 is filled with the electrolyte such as a liquid-phase electrolyte, a solid-phase electrolyte, a gel-type electrolyte, a liquid ion and so on. Accordingly, as the electrical-chemical reaction occurs, the muddy alloyed materials formed via the gate layer 142 and the lithium ions gradually fill into the depletion layer 162 and further fill into the ionic conducting layer 16. That is, after the electrical-chemical reaction occurs, the electrical conductivity of both the depletion layer 162 and the ionic conducting layer 16 can be provided or be improved via the fillers of the muddy alloyed materials and/or the electrolyte. Hence, the lithium metal layer 12, the current collector layer 14 and the gate layers 142 can be electrical and ionic conductive. The structure is illustrated in FIG. 8A. The ionic conducting layer 16 can be electrical conductive due to the conductive materials contained itself. Also, the ionic conducting layer 16 can be electrical conductive after the muddy alloyed materials, which are formed via the alloyed gate layer 142, fill into it. Besides the ceramic material, the polymer material, the liquid-phase electrolyte, the solid-phase electrolyte, the gel-type electrolyte, the liquid ion, the ionic conducting layer 16 can further be made of a conductive material or the combination of all the materials mentioned above with the pores of the ionic conducting layer 16, wherein the conductive material is selected from the group consisting of graphite, graphene, carbon particles, carbon tube, metal particles and/or a conducting material. The combinations of the materials with the pores of the ionic conducting layer 16 further comprise the implements of forming a thin metal film on the metal/metalloid/alloyed conductive material via patterned deposition, sputtering and/or electroplating. The ceramic material includes the metal oxides, the metal sulfides, the metal nitrides or acidized metal (ex. metal phosphates) and so on. Due to the plenty of pores of the ionic conducting layer 16, those pores serve as the paths for the ionic migration. Meanwhile, those pores filled via the alloyed gate layers 142 having the swelling volume serve as the electrical paths for the current collector 14 and the lithium metal layer 12.

Figure 7B:
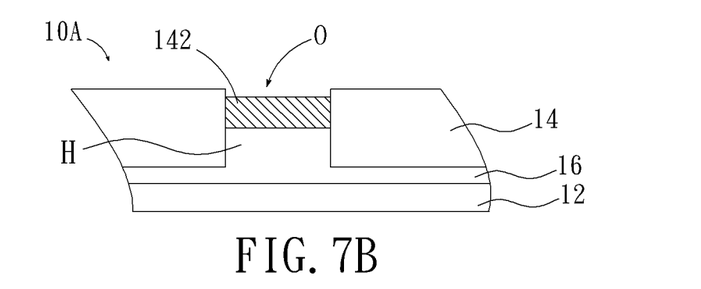
Figure 8B:
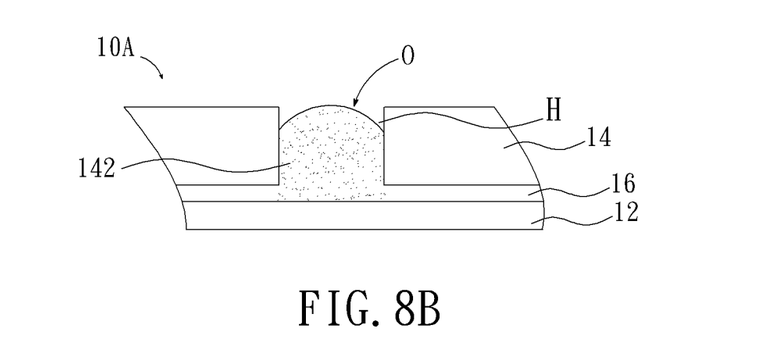
FIG. 8B illustrates the alloyed gate layer according to FIG. 7B.

Besides, In the corresponding positions of the gate layers 142, the ionic conducting layer 16 partially fills into the other end of the openings O of the current collector layer 14 of the lithium metal electrode 10A, as illustrated in FIG. 7B. The ionic conducting layer 16 contacts with the lithium metal layer 12 and the gate layers 142. After the electrical-chemical reaction of the battery system occurs, the muddy alloyed materials formed via the gate layers 142 and the lithium ions gradually fill into the ionic conducting layer 16 and contact with the lithium metal layer 12 for providing the electrical conductivity, as illustrated in FIG. 8B.

Figure 7C:
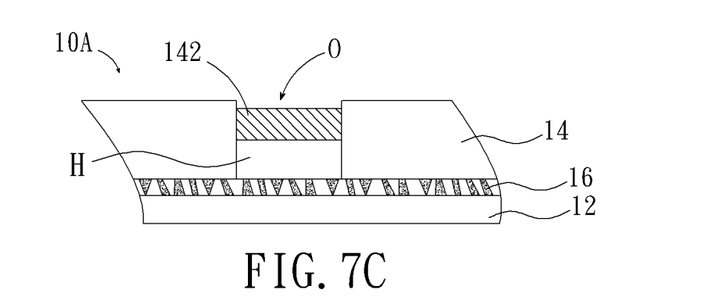
Figure 8C:
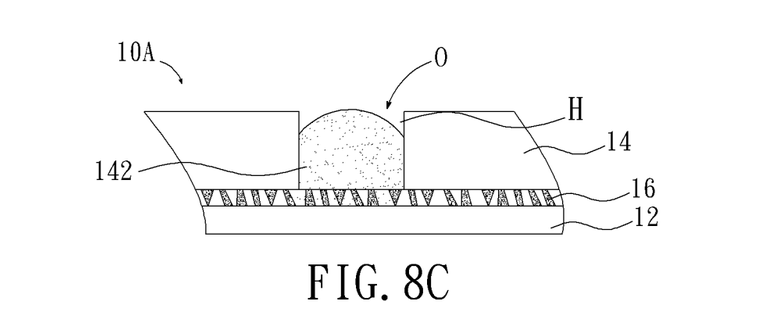
FIG. 8C illustrates the alloyed gate layer according to FIG. 7C.

The ionic conducting layer 16 of the lithium metal electrode 10A illustrated in FIG. 7C is in the shape of rod structure. The ionic conducting layer 16 illustrated in this embodiment may not entirely cover the current collector 14 and the lithium metal layer 12. The ionic conducting layer 16 can be even formed on the surface of the current collector 14, which is facing to the lithium metal layer 12, that is, the ionic conducting layer 16 can be formed away from the holes/openings of the current collector layer 14. The material of the ionic conducting layer 16 can be selected only from the conductive material such as the metal material, alloy material, and/or conductive carbon material. Or the material of the ionic conducting layer 16 can be the combination of conductive material, polymer material and the pores of the ionic conducting layer 16, wherein, in order to enhance the electrical conductivity, the combination of the materials with the pores of the ionic conducting layer 16 further comprise the implements of forming a thin metal film on the metal/metalloid/alloyed conductive material via patterned deposition, sputtering and/or electroplating. The rod-shaped ionic conducting layer 16 is a porous structure so that the pores of the ionic conducting layer 16 can serve as the ionic migration paths. Meanwhile, the end of the ionic conducting layer 16 contact with the lithium metal layer 12 so that the lithium metal layer 12 is able to electrically connect to other layers. As the electrical-chemical reaction occurs, the muddy alloyed materials formed via the gate layers 142 and the lithium ions fill into the pores of the rod ionic conducting layer 16 and contact with the lithium metal layer 12, as illustrated in FIG. 8C.

The electrical conductive ability of the ionic conducting layer 16 can be carried out via the ingredients of the metal material, the alloy materials and the conductive carbon materials or via the muddy alloyed materials formed via the alloyed gate layers 142, wherein the conductive carbon materials comprise the graphite, the graphene, the carbon particles, the carbon tube, the metal particles, and so on. Also, further via the lithium dendrites formed between the lithium metal layer 12 and the current collector layer 14 can provide the electrical conductive ability of the ionic conducting layer 16. Some or all structures mentioned above can be selectively combined to realize the electrical conductive ability of the ionic conducting layer 16. The lithium dendrites are formed as the potential of the lithium metal electrode 10A is close to the relative 0 volt. Under this condition, the potential of the current collector layer 14 is close to the potential of the lithium metal layer 12, which is the potential of the formation of the lithium metal, so that the lithium ions are deposited on the surface of the current collector layer 14. That is, the lithium dendrites start to form from the surface adjacent to the ionic conducting layer 16 of the current collector layer 14 towards the lithium metal layer 12. Until the lithium dendrites formed inside the pores of the ionic conducting layer 16 contact with the lithium metal layer 12, the porous lithium-based ionic conducting layer 16 is formed between the lithium metal layer 12 and the current collector layer 14. That is, the lithium dendrites formed between the lithium metal layer 12 and the current collector layer 14 is a part of the ionic conducting layer 16, which has the similar structure illustrated in FIG. 7C. Comparing to the conventional battery system, the formation of the lithium dendrites would cause the damage of the separator, which would lead to the internal shortage and is harmful to the battery system. However, the lithium dendrites in the present invention are formed between the lithium metal layer 12 and the current collector layer 14 so that no damage would be made. Contrarily, the formation of the lithium dendrites can improve the electrical conductive ability between the lithium metal layer 12 and the current collector layer 14 and can reduce the internal resistance of the battery system as well.

Figure 9A:
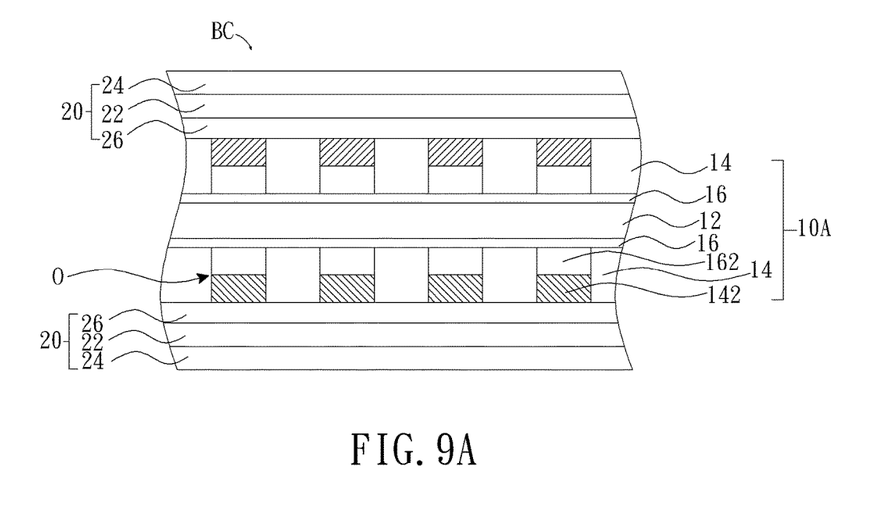
FIG. 9A illustrates the cell comprising the lithium metal electrode of this present invention.

In FIG. 9A, it illustrates the cell comprising the lithium metal electrode of this present invention, wherein the lithium metal electrode (10A) is based on the embodiment illustrated in FIG. 7A.

The battery cell BC includes two first electrode 20 and one second electrode 10A. Each first electrode 20 has an active material layer 22, a first current collector layer 24 and a separator layer 26. The first current collector layer 24 is disposed on one side of the active material layer 22 and the separator layer 26 is disposed on the other side of the active material layer 22, that is, the active material layer 22 is sandwiched via the first current collector layer 24 and the separator layer 26. The second electrode 10A is sandwiched via the two first electrodes 20. The second electrode 10A comprises in order of a second current collector layer 14 having the holes H, a plurality of gate layer 142 disposed in the end of the openings O of the holes H, an ionic conducting layer 16, a lithium metal layer 12, the ionic conducting layer 16, the second current collector layer 14 having the holes H and the gate layer 142 disposed in the end of the openings O of the holes H. That is, the second current collector layers 14 on the two sides of the second electrode 10A are correspondingly adjacent to the separator layers 26 of the two first electrodes 20.

Figure 9B:
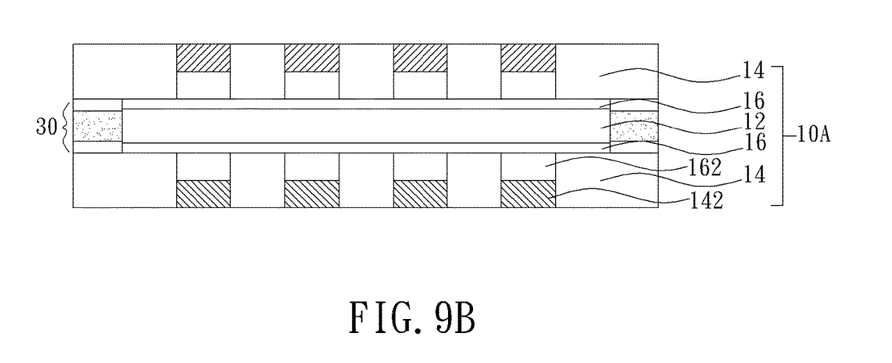
FIG. 9B illustrates the package of the lithium metal electrode of this present invention.

In FIG. 9B, the package of the lithium metal electrode of this present invention is illustrated. A package unit 30 is exerted to seal the edges of the second electrode 10A so that the sealed second electrode 10A can expose to the normal environment. The package unit 30 is made of the moisture-blocking material, the gas-blocking material or a combination thereof; the configuration of the package unit 30 maybe in any shapes such as a frame. The package unit 30 may be a single-layer silicon frame or a multi-layer silicon frame. In this embodiment, the package unit 30 is a three-layer silicon frame. However, the package unit 30 is not an essential element for the second electrode 10A. For instance, before packing, the first electrode 20 assembles to the second electrode 10A first.

The first electrode 20, which soaks the medium (ex. electrolyte) via the separator layer 26, is assembled to the second electrode 10A via the proper process procedure (ex. hot pressing) to form the battery cell BC. Once the battery cell BC starts to be charged, the medium would flow from the first electrode 20 to the second electrode 10A so that a great amount of lithium ions migrate toward the second electrode 10A. The lithium ions migrate into the openings O of the current collector layer 14 and reach to the gate layers 142. The gate layers 142 start to be alloyed and gradually more and more muddy alloyed materials are formed. Thus, the potential of the second current collector 14, the gate layers 142 and the ionic conducting layer 16 are close to the lithium metal layer 12, that is, the potential of the whole second electrode 10A is close to the relative 0 volt.

After several times of charging and discharging, several times of alloying and dealloying reactions have occurred. There must be some losses of the lithium ions of the medium. Some reasons for losing the lithium ions may because some incomplete reduction of alloyed gate layers are dissociate in the medium or some lithium dendrites are formed. Hence, the lithium ions of the lithium metal layer 12 can be fed back to the battery cell continuously via the muddy alloyed materials filled inside the holes H for improving the performance of the battery system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium metal electrode, comprising:
    a current collector layer, having a plurality of holes and each of the holes has an opening; and
    a plurality of gate layers, covering the opening and comprising at least a material configured to alloy with a lithium ion or a lithium metal and the gate layer are configured to transfer into a particulate alloy-mud state after the irreversible reaction of alloy;

a lithium metal layer, covered via the current collector layer and the gate layers;
wherein the lithium metal electrode is stored and operated under normal condition before applied to a battery system.

2. The lithium metal electrode of claim 1, wherein the gate layer further covers the opening.

3. The lithium metal electrode of claim 1, wherein the gate layer further covers and fills the hole.

4. The lithium metal electrode of claim 1, wherein the gate layer further fills the hole.

5. The lithium metal electrode of claim 1, wherein the gate layers partially cover the current collector layer.

6. The lithium metal electrode of claim 1, wherein the holes are through holes and/or blind holes.

7. The lithium metal electrode of claim 6, wherein the holes are further covered via the lithium metal layer.

8. The lithium metal electrode of claim 6, wherein the openings of the holes are further covered and filled via the lithium metal layer.

9. The lithium metal electrode of claim 6, wherein the openings of the holes are further filled via the lithium metal layer.

10. The lithium metal electrode of claim 6, wherein the current collector layer is further covered via the lithium metal layer entirely.

11. The lithium metal electrode of claim 1, wherein the gate layers are disposed adjacent to the lithium metal layer and further have no contact or contact with the lithium metal layer.

12. The lithium metal electrode of claim 1, wherein the gate layers are disposed away from the lithium metal layer.

13. The lithium metal electrode of claim 1, further comprising:
an ionic conducting layer, disposed adjacent to the lithium metal layer, wherein the ionic conducting layer has no alloy reaction with the lithium metal layer.

14. The lithium metal electrode of claim 13, wherein the ionic conducting layer at least contact partially with the current collector layer and/or at least contact partially with the lithium metal layer and/or at least contact partially with the gate layers.

15. The lithium metal electrode of claim 13, wherein the ionic conducting layer is further electrically conductive.

16. The lithium metal electrode of claim 13, wherein the ionic conducting layer is in the shape of porous structure, grid structure, rod structure or a combination thereof.

17. The lithium metal electrode of claim 13, wherein the ionic conducting layer is further made of a material selected from the group consisting of a ceramic material, a polymer material, a conductive carbon material, a metal material, an alloy material, a conductive material or a combination thereof.

18. The lithium metal electrode of claim 1, wherein the current collector layer is made of a material selected from the group consisting of copper, nickel, iron, zinc, gold, silver, titanium and/or a lithium-unalloyable material.

19. The lithium metal electrode of claim 1, wherein the material is selected from the group consisting of aluminum, tin, silicon, alloyed aluminum, alloyed tin, alloyed silicon and/or a combination thereof.

20. The lithium metal electrode of claim 19, wherein the medium is made of a material selected from the group consisting of a liquid-phase electrolyte, a solid-phase electrolyte, a gel-type electrolyte, a liquid ion or a combination thereof.

21. The lithium metal electrode of claim 1, further comprises:
at least an isolation region, disposed on a surface, which is away from the lithium metal layer, of the current collector layer and is an electrical-isolated layer or an electrical-isolation-treated surface.

* * * * *